US012005457B2

(12) United States Patent
Back et al.

(10) Patent No.: US 12,005,457 B2
(45) Date of Patent: Jun. 11, 2024

(54) BLADE

(71) Applicant: Lumbeck & Wolter GmbH & Co. KG, Wuppertal (DE)

(72) Inventors: Udo Back, Münnerstadt/Reichenbach (DE); Fabian Döring, Wuppertal (DE)

(73) Assignee: Lumbeck & Wolter GmbH & Co. KG, Wuppertal (DE)

( * ) Notice: Subject to any disclaimer, the term of this patent is extended or adjusted under 35 U.S.C. 154(b) by 0 days.

(21) Appl. No.: 17/997,729

(22) PCT Filed: Apr. 6, 2021

(86) PCT No.: PCT/EP2021/058914
§ 371 (c)(1),
(2) Date: Dec. 13, 2022

(87) PCT Pub. No.: WO2022/002450
PCT Pub. Date: Jan. 6, 2022

(65) Prior Publication Data

US 2023/0191422 A1 Jun. 22, 2023

(30) Foreign Application Priority Data

Jun. 30, 2020 (DE) ..................... 20 2020 103 763.3

(51) Int. Cl.
*B02C 18/30* (2006.01)
*B02C 18/36* (2006.01)

(52) U.S. Cl.
CPC ............ *B02C 18/362* (2013.01); *B02C 18/30* (2013.01); *B02C 18/36* (2013.01)

(58) Field of Classification Search
CPC ........ B02C 18/362; B02C 18/30; B02C 18/36
See application file for complete search history.

(56) References Cited

U.S. PATENT DOCUMENTS 4,153,208 A * 5/1979 Vomhof .................. B02C 18/36 241/82.5
4,422,582 A * 12/1983 Roeger .................. B02C 18/36 241/82.5
2013/0284835 A1* 10/2013 Quadrana ............ B02C 18/304 241/92

FOREIGN PATENT DOCUMENTS

CN 201002042 Y * 1/2008 ............ B02C 18/36
DE 1759328 U 1/1958
DE 1851135 5/1962
DE 2901112 A1 7/1980
DE 29905706 U1 * 7/1999 ........... B02C 18/304
DE 19908665 C1 1/2001
DE 102009049844 A1 4/2011
DE 102013018785 A1 * 5/2015 ........... B02C 18/362
(Continued)

OTHER PUBLICATIONS

International search report in international patent application No. PCT/EP2021/058914, dated Jun. 22, 2021.

*Primary Examiner* — Faye Francis
(74) *Attorney, Agent, or Firm* — Oppedahl Patent Law Firm LLC

(57) ABSTRACT

The invention relates to a blade, more particularly for a meat grinder. The blade (10) has a collar-type sealing ring (18) between the hub (11) and the inner ends of the blade wings (14). The sealing ring (18) has the same height as the hub (11) as the adjacent sealing ring (18) has or the hub (11) has a smaller height. The hub (11) thus does not impede the rubbing of the cutting edges (16, 17) of the blade (10) or the rubbing of the sealing ring (18).

18 Claims, 2 Drawing Sheets

(56) References Cited

FOREIGN PATENT DOCUMENTS

| | | | |
|---|---|---|---|
| DE | 102017109978 | A1 | 11/2018 |
| DE | 202020103763 | U1 | 8/2020 |
| EP | 2821143 | A1 | 1/2015 |

* cited by examiner

BLADE

The invention relates to a blade, in particular for a meat grinder. Meat grinders of this type are used in particular in the meat-processing industry.

During the operation of the meat grinder, the material to be ground is pressed against the cutting set by means of a screw conveyor. The cutting set usually consists of pre-cutters, washers and blades. The cutting elements of the cutting set used must withstand these loads. The blades are mounted on a blade journal and have a central hub provided with a bore for the purpose of preventing rotation of the blades relative to the journal. In order to prevent accumulations around the hub of material to be ground, in a known blade according to document DE 199 08 665 C1, sealing rings were provided at the inner end of the knife blades adjacent to the hub. These sealing rings have the height of the knife blades. Advantageously, a wear equilibrium is established between the wear surface of the knife blades and the sealing ring. Due to wear, the blades must be reground after a certain period of time. However, such a blade according to DE 199 08 665 C1 shows disadvantages during regrinding of the knife blades.

Based on this prior art, an improved blade is to be proposed. This object is achieved with a blade having the features of claim 1. The blade configured in this way facilitates the grinding of the cutting edges and of the sealing ring.

The new blade also has a central hub provided with a bore for a rotation-fixed chamfer on a blade journal and a plurality of knife blades with cutting edges. In this blade, the cutting edges are preferably provided on both sides. The radially outer ends of the knife blades are connected to a blade ring. The radially inner ends of the blade wings terminate in an inner rim. A collar-like sealing ring is provided between the hub and the inner ends of the blade wings. In one embodiment, on the other hand, the same height as the hub has the same height, so that when grinding the blades and the sealing ring, the hub is not an obstacle.

In a further embodiment, the sealing ring has, on the one hand, the height of the cutting edges and the hub has a lower height than the adjacent sealing ring. Also in this case, the hub does not impede the grinding of the blades and the sealing ring. The height of the hub can be so small that it does not protrude beyond the inner rim.

The sealing ring is preferably provided only on one side of the blade, preferably on the outlet side. On the other side, the side without a sealing ring, the hub has a height greater than the height of the blades. In this case, too, the hub impedes the grinding of the blade less, since no sealing ring is provided in the region of the inner rim of the blade and the cutting edges are arranged at a sufficient distance from the hub, for example at a distance of 3 mm to 25 mm.

In addition, for good mixing of the material to be ground, the blade can have knife blades with different cutting edges, namely, on the one hand, cutting edges which extend over the entire radial length of the blade wings, that is to say between the inner ring and the outer blade ring, and on the other hand cut the cutting edges which are shortened in their radial length. The cutting edges are present on both sides of the blade wing, that is, both on the inlet side and on the outlet side. In this case, in particular, an alternating arrangement of full-length and shortened cutting edges on the blade is provided. Such an arrangement is provided in particular for the outlet side but also for the inlet side. In a preferred embodiment, each blade wing has on one side a shortened cutting edge and on the other side a full-length cutting edge.

As a result of the cutting edges of different lengths, the material to be ground is mixed in addition to the rotary movement of the blade. For components which accumulate on the outer diameter of the blade, in a preferred embodiment, a plurality of separating openings can be provided on the outer blade ring, which facilitate the further transport of the material to be ground.

The good mixing of the material to be ground is further supported by openings of different sizes, namely openings in each case between two knife blades, the inner ring and the outer blade ring. The openings of different sizes are produced, for example, by blade wings of different widths. However, in the case of equally wide knife blades, it is also possible to achieve intermediate spaces of different sizes if the blade wings protrude from the inner ring at different angles. In both cases, there are openings which have different angles between the adjacent blade wings. Furthermore, it has been shown that such differently sized openings, in particular when there is no symmetrical arrangement of openings in the blade of different sizes, vibrations of the blade are prevented during the rotation of the blade.

In the drawing, an exemplary embodiment of the new blade for a meat grinder is shown. The drawing is in several figures, of which:

Figure 1:
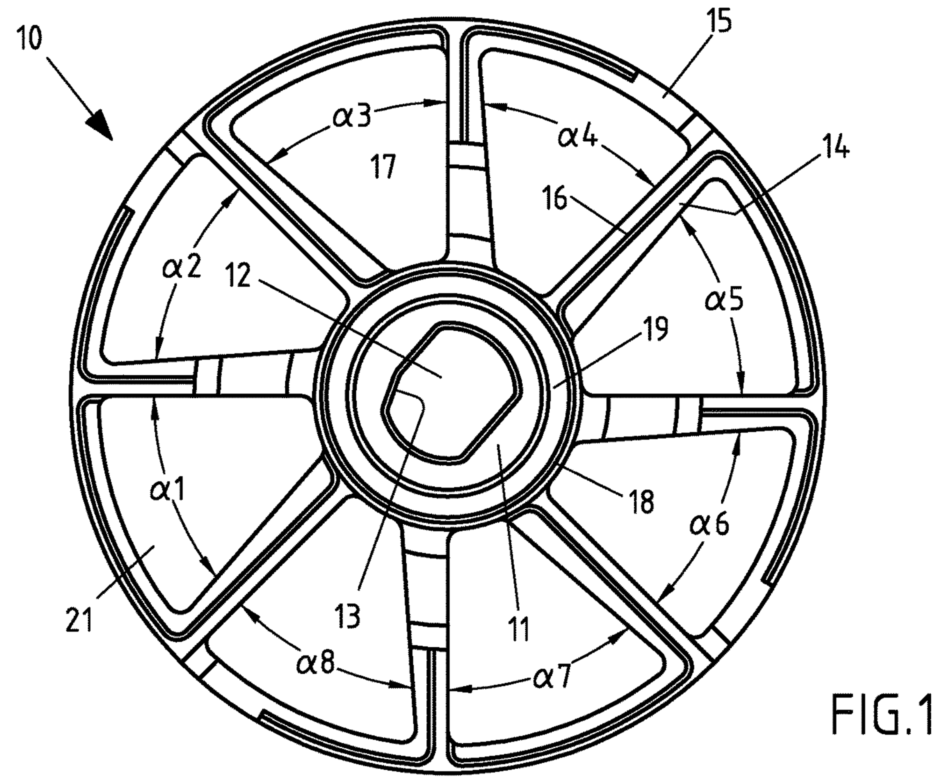
FIG. 1 shows a view of the outlet side of the blade.

The blade 10 has centrally a hub 11 with a through bore 12. This central hub 11 serves to support the blade 10 in a rotationally fixed manner onto a blade journal which is connected to a screw conveyor of the meat grinder. Upon rotation of the screw conveyor, the blade 10 is rotated. In this example, the hub 11 has a coding 13, so that only suitable blades 10 can be placed on a coded blade journal with an identical cross section. This coding also has the advantage that the blade 10 cannot be arranged incorrectly in the meat grinder but always points into the outlet side shown in FIG. 1 in the conveying direction F of the material to be ground. The new blade 10 has a plurality of knife blades 14 which extend from the inner ring 19 to the outer blade ring 15. In this case, eight knife blades 14 are provided. Along the radial length of these blades 14, in the case of four knife blades 14, cutting edges 16 are provided which extend over the entire length and, in the case of four knife blades 14, shortened cutting edges 17 are provided which, starting from the blade ring, extend only over a partial length of the blades 14. In this example, the shortened cutting edges 17 on the blades 14 extend from the outer blade ring 15, that is, close to the inner ring, recesses are present. These recesses facilitate mixing when rotating the blade. In the case of further embodiments of a blade, which are not shown, the recesses can also be provided centrally on the blade wing 14, that is shortened cutting edges can also be arranged on the blade with cutting regions close to the inner rim and close to the outer rim or also only in the region of the inner rim 19 and a recess in the region of the outer blade ring 15. All of the aforementioned arrangements support mixing of the material to be ground.

For good mixing of the material to be ground and for preventing vibrations of the blade 10 during the operation of the meat grinder, differently sized openings 21 are also provided, which show different angles a1 to a8 between the adjacent knife blades 14. In this example, all blade wings 14 are the same width. The openings 21 of different sizes between in each case two knife blades 14, the inner ring 19 and the outer blade ring 15 are achieved in that the blades 14 protrude from the inner ring 19 at different angles. The openings 21 in the blade 10 are arranged asymmetrically, so the stated angles have the following values: a1=41°, a2=42°, a3=48°, a4=43°, a5=47°, a6=46°, a7=44°, and a8=49°. This asymmetrical arrangement of larger and smaller openings 21 promotes the smooth rotation of the blade 10.

Figure 3:
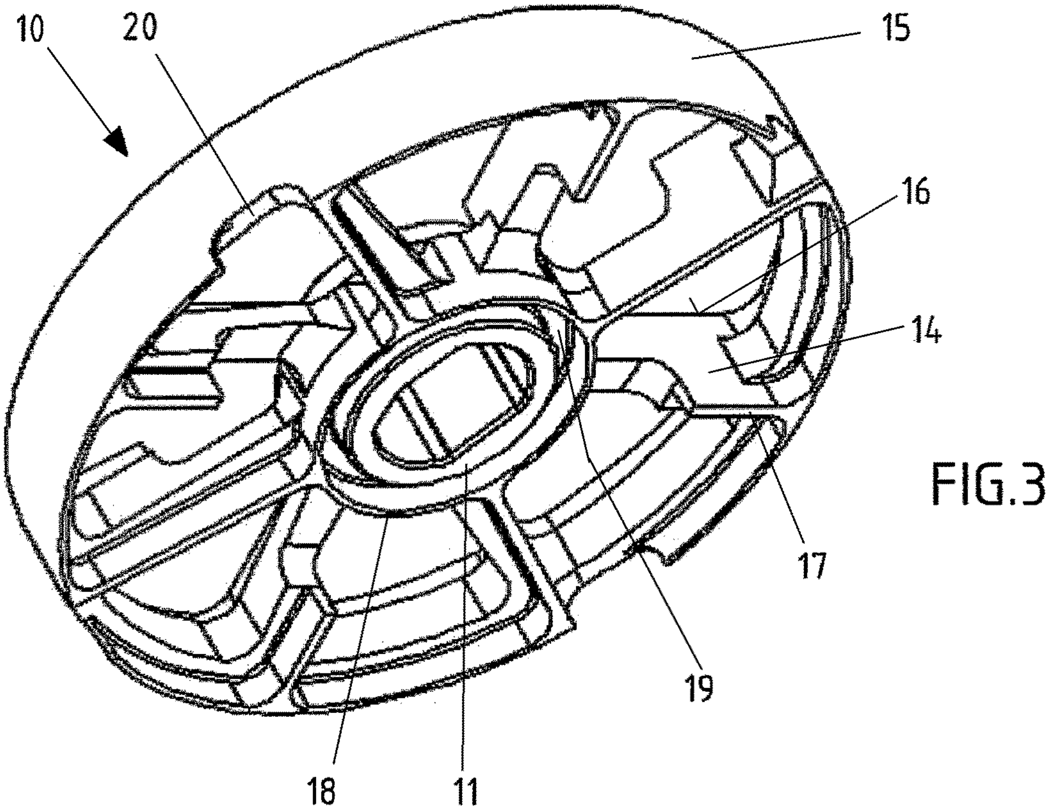
FIG. 3 shows a perspective view of the blade according to FIG. 1 with a view of the outlet side.
Figure 4:
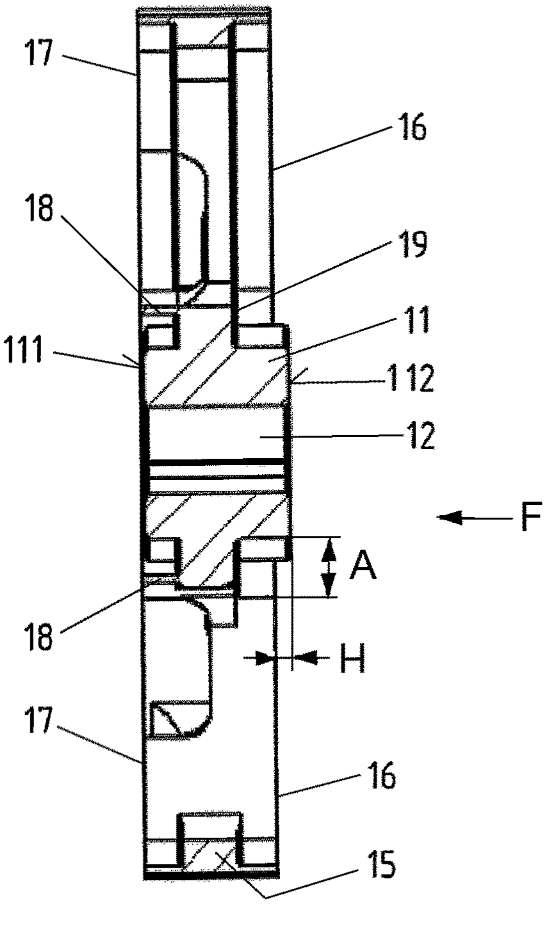
FIG. 4 shows a section through the blade according to FIG. 1.

On the outlet side of the blade 10 shown in FIG. 1 and FIG. 3, a sealing ring 18 is present at the outer radius of the inner rim 19. This sealing ring 18 is located adjacent to the hub 11 and adjacent to the full-length cutting edges 16. In FIG. 4, the left side is the outlet side, because the material to be conveyed is pressed against the blade from the right side in the conveying direction F. From FIG. 4, it becomes clear that the cutting edges 16, 17—here only the cutting edges 17—have the same height as the sealing ring 18 and also the same height as the hub 11, since the end face of the hub 11, the cutting edges 17 and the end of the sealing ring 18 are at a height. If such a blade 10 is removed after a certain wear and subjected to a grinding process, the hub 11 does not impede this grinding process, since the end face of the hub 11 is at the same height as the sealing ring 18 and the cutting edges 16, 17.

Figure 2:
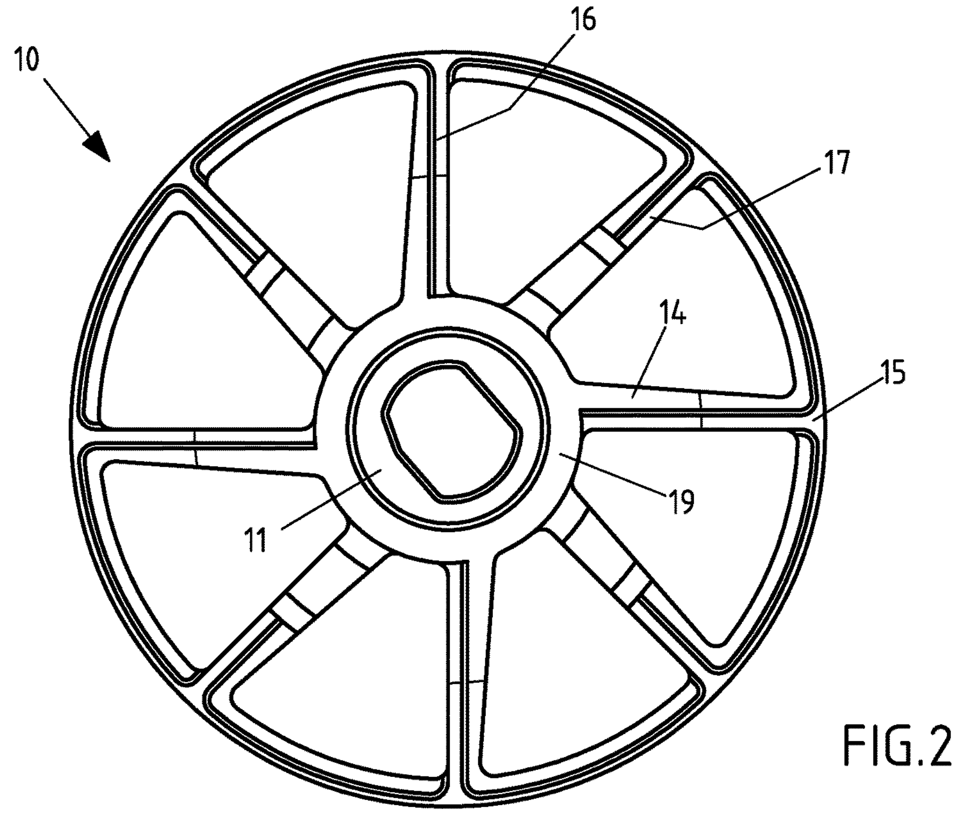
FIG. 2 shows a view of the inlet side of the blade according to FIG. 1.

No sealing ring is present on the opposite side of the blade, the entry side. Here, adjacent to the hub 11, the inner rim 19, from which the blade wings 14 extend outwardly to the outer blade ring 15, is arranged adjacent to the hub 11. The inlet side of the blade 10 shown in FIG. 2 is the right side in FIG. 4. The ground material moved in the conveying direction F thus first impinges on this inlet side of the blade 10. Since there is no sealing ring on this side, the cutting edges 16, 17 are at a distance A from the hub 11. This distance A in this example is 5 mm and thus large enough that, when the cutting edges 16, 17 are looped on the inlet side, the hub 11 is not an obstacle. The hub 11 can accordingly have a greater height H on the inlet side and project beyond the cutting edges 16, 17. In this example, the height H is 2.5 mm. In other exemplary embodiments, the height H is 1.5 to 5 mm.

Knife blades 14 with shortened cutting edges 17 and full-length cutting edges 16 are also provided on this entry side. As can be better seen from FIG. 3, each knife 14, which has a full-length cutting edge 16 on the inlet side, has a shortened cutting edge 17 on the outlet side, and each knife 14, which has a shortened side 17 on the inlet side.

This arrangement leads to a good mixing of the material to be ground. Should components of the material to be ground accumulate at the outer diameter, that is, on the inner side of the outer blade ring, they can be moved further on the outlet side via separating openings 20 in the conveying direction. In this example, there are four separating openings 20, shown in FIG. 3. In further embodiments of the blade 10, which are not shown, fewer or more separating openings 20 are also provided.

LIST OF REFERENCE SIGNS

10—Blade
11—Hub
111—Hub surface, exit side
112—Hub surface, entry side
12—Bore
13—Coding
14—Knife
15—Outer blade ring
16—Full-length cutting edge
17—Shortened cutting edge
18—Sealing ring
19—Inner rim
20—Separating openings
21—Openings
A—Distance
F—Conveying direction
H—Height

The invention claimed is:

1. A blade (10) configured for a meat grinder, the blade comprising:
- a central hub (11) provided with a bore (12) for rotationally fixed mounting on a blade journal,
- a plurality of knives (14) with cutting edges (16, 17) on both sides, the knives having radially outer ends and having inner ends, the cutting edges having a height, wherein the radially outer ends of the plurality of knives (14) are connected to a blade ring (15),
- a collar-shaped sealing ring (18) between the hub (11) and the inner ends of the knives (14), the sealing ring having a height, wherein the sealing ring (18) has the height of the cutting edges (16, 17), wherein
- the hub (11) has the same height as the adjacent sealing ring (18) or
- the hub (11) has a lower height than the adjacent sealing ring (18).

2. The blade according to claim 1, wherein the sealing ring (18) is provided only on one side of the blade.

3. The blade according to claim 2, wherein the hub (11) has a height (H) on the side where no sealing ring is arranged, which height (H) is greater than the height of the cutting edges (16, 17).

4. The blade according to claim 3, wherein a sufficient distance (A) is present on the side without a sealing ring between the hub (11) and the cutting edges (16, 17).

5. The blade according to claim 1, the blade having an outlet side, wherein the blade ring (15) has one or more separating openings (20) on the outlet side.

6. The blade according to claim 1, the blade having an outlet side, the cutting edges having a radial length, wherein a plurality of cutting edges (17) are shortened in their radial length on the outlet side.

7. The blade according to claim 5, the blade having an inlet side, the cutting edges having a radial length, wherein a plurality of cutting edges (17) are shortened in their radial length on the inlet side.

8. The blade according to claim 6, wherein alternately shortened cutting edges (17) and full-length cutting edges (16) are arranged on the plurality of knives (14).

9. The blade according to claim 6, wherein an even number of knives among the plurality of knives (14) are arranged alternately with two shortened cutting edges (17) and two full-length cutting edges (16) on the plurality of knives (14).

10. The blade according to claim 7, each knife among the plurality of knives having a one side and an other side, wherein each knife among the plurality of knives (14) on one side has a shortened cutting edge (17) and on the other side a full-length cutting edge (16).

11. The blade according to claim 1, the blade having an inner ring, wherein an opening (21) is located between each two adjacent knives among the plurality of knives (14), the inner ring (19) and the outer blade ring (15), wherein each two adjacent openings (21) have different sizes.

12. The blade according to claim 11, wherein the openings (21) of different sizes are formed by knives of different widths among the plurality of knives (14).

13. The blade according to claim 11, wherein the openings (21) of different sizes are formed by a differing orientation of the knives among the plurality of knives (14).

14. The blade according to claim 1, wherein there are openings of differing sizes in the blade, the openings defining an arrangement, and further characterized in that the arrangement of openings (21) of differing sizes is asymmetrical.

15. The blade according to claim 1, wherein the hub (11) has a lower height than the adjacent sealing ring (18).

16. The blade according to claim 2, the blade having an outlet side, wherein the sealing ring (18) is provided only on the outlet side.

17. The blade according to claim 3, wherein the height (H) is 1.5 mm to 5 mm.

18. The blade according to claim 4, wherein the distance (A) is 3 mm to 25 mm.

* * * * *